United States Patent
Pintiysky et al.

(10) Patent No.: US 11,609,993 B2
(45) Date of Patent: Mar. 21, 2023

(54) EMULATOR AND EMULATION METHOD

(71) Applicant: AO Kaspersky Lab, Moscow (RU)

(72) Inventors: Vladislav V. Pintiysky, Moscow (RU);
Denis V. Anikin, Moscow (RU);
Dmitry A. Kirsanov, Moscow (RU);
Sergey V. Trofimenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 22 days.

(21) Appl. No.: 17/090,971

(22) Filed: Nov. 6, 2020

(65) Prior Publication Data

US 2021/0397708 A1    Dec. 23, 2021

(30) Foreign Application Priority Data

Jun. 19, 2020  (RU) ................................ 2020120434

(51) Int. Cl.
*G06F 21/00*     (2013.01)
*G06F 21/56*     (2013.01)
*G06F 9/455*     (2018.01)
*G06F 21/52*     (2013.01)

(52) U.S. Cl.
CPC ........ *G06F 21/566* (2013.01); *G06F 9/45508* (2013.01); *G06F 21/52* (2013.01); *G06F 2221/033* (2013.01)

(58) Field of Classification Search
CPC .... G06F 21/566; G06F 9/45508; G06F 21/52; G06F 2221/033; G06F 9/455; G06F 21/56
See application file for complete search history.

(56) References Cited

U.S. PATENT DOCUMENTS

| 7,603,713 | B1 | 10/2009 | Belov | |
| 2004/0221273 | A1* | 11/2004 | Sandham | G06F 9/44589 703/23 |
| 2011/0029681 | A1* | 2/2011 | Lee | A63F 13/352 709/230 |
| 2011/0225655 | A1 | 9/2011 | Niemelae et al. | |
| 2012/0266243 | A1* | 10/2012 | Turkulainen | G06F 21/566 726/22 |
| 2015/0242626 | A1* | 8/2015 | Wang | G06F 21/577 726/23 |
| 2018/0203713 | A1* | 7/2018 | Elfering | G06F 9/4411 |

FOREIGN PATENT DOCUMENTS

EP    2713302 A1    4/2014

* cited by examiner

*Primary Examiner* — Ghazal B Shehni
(74) *Attorney, Agent, or Firm* — ArentFox Schiff LLP; Michael Fainberg

(57) ABSTRACT

A method for emulating execution of a file includes emulating execution of the instructions of a file on a virtual processor of an emulator. The execution of the instructions is halted in response to an invocation of an API function. A determination is made whether the invoked API function is present in the updatable modules of the emulator. The updatable modules contain implementation of API functions. In response to determining that the invoked API function is present in the updatable modules, execution of the invoked API function is emulated according to corresponding implementation contained in the updatable modules. Otherwise, result of execution of the invoked API function is generated by executing a corresponding virtual API function on a processor of a computing device.

18 Claims, 6 Drawing Sheets

EMULATOR AND EMULATION METHOD

CROSS-REFERENCE TO RELATED APPLICATION

This application claims benefit of priority under 35 U.S.C. 119(a)-(d) to a Russian Application No. 2020120434 filed on Jun. 19, 2020, which is incorporated by reference herein.

FIELD OF TECHNOLOGY

The invention relates to the field of cybersecurity, and, more specifically, to emulator and method for emulating execution of files for the purpose of detection of malware.

BACKGROUND

The code of modern applications, including malicious ones, may include a complicated set of instructions containing transitions, calls, including recursive calls, cycles, and so forth. It should be noted that the computational complexities of executable files is constantly growing. This is due to the expanding functionality of software with the use of high-level programming languages containing numerous libraries, as well as the greater complexity of computer hardware and operating systems (OS). This growing complexity applies to both trusted applications and malicious ones. Malicious applications may perform a number of characteristic actions, such as the theft of passwords and other confidential user data, the incorporating of a computer in a botnet to carry out DDoS attacks or distribute spam, the blocking of the proper working of the system for the purpose of extortion, and other negative and unwanted actions for the user.

One of the methods of investigating a potentially malicious code is the use of an emulator, which can be employed in an antivirus application during the analysis of the behavior of the application. Various methods of emulation exist. One of these methods is a software/hardware simulation of the hardware components of the computer system and various structures of these components—the processor, the memory, and other devices by creating virtual copies of the registers of the processor, the memory, and the instruction set of the processor. Furthermore, a hybrid approach to emulation is possible, involving a hardware and software emulation. In this hybrid approach, an additional simulation of the operating system of the computer is performed by creating virtual copies of the components of the OS (virtual operating system) in which the execution of the application is emulated. Such components are, for example, the portion of the kernel of the OS responsible for its essential operating mechanisms, such as the input/output subsystems, the user-level file system, the mechanisms for creating and initiating processes, the handling of interrupts and exceptions, the calls for system API (application programming interface) functions, the drivers of devices, memory management, and so forth. Thus, the instructions of an application are executed in the emulator not on a real-world processor, but on a virtual copy of the processor, the system API function calls are emulated and the emulated result of the execution of the function is returned.

During the emulation, a log of function calls is formed, to which the antivirus scan also has access. The log usually keeps data on the calls of API functions made by the process during the emulation of the execution, and also data on the returns from the API functions called (transfer of control to the return address). The completeness of this log affects in particular the quality of detection of malicious files on malware affected computer systems. For example, the false positive and false negative errors are reduced, resulting in a high detection rate and low false positive rate. For this, the antivirus checks the log for a correspondence with signatures of antivirus databases of malicious files, which are known sequences of function calls characteristic of malicious files. Thus, if at least one signature is found in the log of function calls, the antivirus classifies the file being checked to be malicious.

Many modern-day malicious applications employ various anti-emulation approaches (anti-emulation tricks), making it possible to determine the fact that the application is being executed not on an actual computer, but in an emulator. In this case, the malicious application will not perform any malicious actions in the emulator, since these tricks operate at the beginning of its execution and the malicious functionality will not be called up. As a result, the antivirus application will erroneously consider the malicious application to be trusted and will allow its execution on the actual computer, or consider it to be a "gray" application, that is, one requiring permission from the user to execute its functionality, depending on the settings of the antivirus application. Anti-emulation tricks may involve a checking for the presence of running services, set system variables, and other elements present in an actual OS. For example, when certain checks are performed unsuccessfully, the emulated program simply terminates its execution. Furthermore, the malicious application might check the proper implementing of API function calls or consult rare API functions whose implementation might be absent from the emulator.

Therefore, in order to improve the quality of detection of malicious software applications and to defeat the anti-emulation tricks, an antivirus emulator should simulate the hardware and software components of a computer as completely as possible. However, it is practically impossible to completely simulate the OS and the hardware components, since it is necessary to copy in fact the code of the entire OS, which affects the speed of performance of tasks. Many malicious applications check the time of their execution and if the time is greater than an anticipated value the malicious application discovers that it is being executed not in an actual environment, but in an emulator. Moreover, the more complete the implementation of an emulator, the more computer resources are needed for the emulation. Therefore, emulators usually implement a simulation of the most important hardware and software components, as well as the API function calls that may be used most often. The calls of rarely used API functions may be implemented in the form of so-called "stub" functions (one not performing any meaningful action, returning a blank result or the input data in unchanged form). Alternatively, implementation of the calls of rarely used API functions may be generated by the emulator on the fly, returning the generated result. The generated result may be arbitrary or it may depend on the type of function—for example, in response to a function call for working with a structured file there can be returned an arbitrary file handler. Such an approach can achieve an optimal balance between performance and quality of detection, but it also has obvious shortcomings, due to the possibility of the malicious applications using anti-emulation tricks. Therefore, antivirus companies are constantly improving and updating the emulator code, incorporating the implementation of new API function calls, and also correcting the API function calls already implemented. For example, if a new malicious application has been discovered, one which invokes a rare API function for which only a stub was present in the emulator, a more complete implementation of this API function will be written and the code of the emulator will be updated on the computers of users. However, the problem is that the updating of the implementation of functions requires the releasing of an update of the code of the entire emulator. The update process is rather complex and takes a lot of time. What is more, until such time as the emulator is updated, the quality of the emulation will be inadequate for the detection of the new malicious applications.

Quality of emulation in conventional approaches is lowered when using new anti-emulation tricks before the code of the emulator is updated.

Thus, there is a need to solve the problem of an inadequate quality of emulation.

SUMMARY

Disclosed are systems and methods for an enhanced reliability of emulation of the instructions of a file by using implementations of API functions which are contained in updatable modules of an emulator.

Advantageously, the disclosed embodiments increase detection rate for malicious code by using the emulator and decrease the response time to new threats.

In one aspect, a method is proposed for emulating execution of a file, wherein the method involves steps in which: execution of one or more instructions of a file is emulated on a virtual processor of an emulator. The execution of the one or more instructions is halted in response to an invocation of an Application Programming Interface (API) function. A determination is made whether the invoked API function is present in one or more updatable modules of the emulator. The one or more updatable modules contain implementation of one or more API functions. In response to determining that the invoked API function is present in the one or more updatable modules, execution of the invoked API function is emulated according to corresponding implementation contained in the one or more updatable modules. In response to determining that the invoked API function is not present in the one or more updatable modules, result of execution of the invoked API function is generated by executing a corresponding virtual API function on a processor of a computing device.

In one aspect, the file includes one of an executable file, a library file, a driver, a script file, or a batch file containing console commands.

In one aspect, emulating execution of the one or more instructions of the executable file includes emulating the one or more instructions in a context of a process of the executable file.

In one aspect, emulating execution of the one or more instructions of the library file includes emulating the one or more instructions in a context of a specified process containing a plurality of calls of library functions to be emulated.

In one aspect, emulating execution of the one or more instructions of the driver includes emulating the one or more instructions in a context of a system process.

In one aspect, emulating execution of the one or more instructions of the script file includes emulating the one or more instructions in a context of an interpreter process for the file. The file is additionally sent to an input of the interpreter.

In one aspect, emulating execution of the one or more instructions of the batch file containing console commands includes emulating the one or more instructions in a context of a process of a console command interpreter.

In one aspect, the invoked API function in the one or more updatable modules is implemented using a precompiled native code of the API function. The native code includes one or more instructions simulating the execution of the invoked API function.

In one aspect, at least one API function present in the one or more updatable modules is implemented using virtual code.

In one aspect, the generated result depends on one or more parameters of the invoked API function call and/or depends on a convention for invoking the corresponding API function.

In one aspect, the execution of the loaded process continues using the result of the execution of the invoked API function.

In one aspect, the execution of the loaded process continues until one or more conditions for halting the emulation occurs. The one or more halting conditions include: a predefined number of instructions has been emulated, a predefined number of API functions has been emulated, time allocated for the emulation has elapsed, a virus signature has been triggered.

In one aspect, the result of the execution of the invoked API function includes at least: a returnable value, a change in state of one or more registers and a change in a stack of the process or of the emulator. The emulation of further instructions is carried out with respect to the changes.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for emulating execution of a file. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

A number of definitions and concepts that will be used in describing variant aspects of the present disclosure will now be introduced.

"Emulation" refers to a complex of software, hardware, or a combination thereof, designed to copy the functions from a first computing system to a second computing system, different from the first computing system, such that the emulated behavior of the second computing system corresponds as closely as possible to the behavior of the original (first computing) system.

"Emulation of file execution" refers to a simulation of the execution of a file on one device using another device or devices of a computing machine.

"Emulation of the execution of an instruction" refers to a simulation of the execution of an instruction on one device using another device or devices of a computing machine. The term "instruction" refers to an instruction of executable code, which may be contained in an executable file, in the image of an executable file, and/or in nonexecutable file containing executable code (such as a DLL library).

"An image of a file" refers to a representation of a file during the process of emulation of its execution. In other words, an image of a file includes a set of data describing the file at least with the necessary completeness for its execution (and also the emulation of the execution). During the emulation of the execution of a file, the emulation module may emulate the execution of the instructions of the image of the image file. The image file instructions may be implemented in different ways: both in the form of machine instructions and in the form of intermediate code (Microsoft Intermediate Language (MSIL) instructions or P-Code) or a script.

Figure 6:
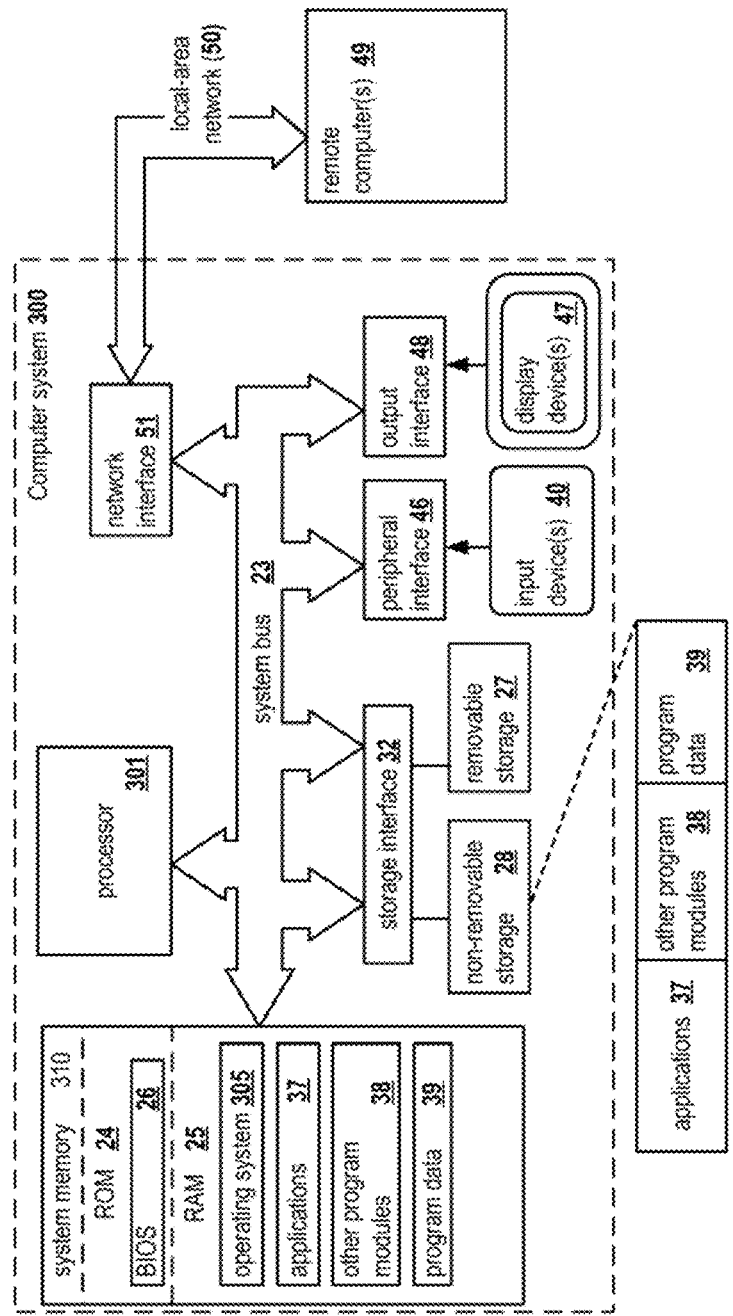
FIG. 6 shows an example of a general-purpose computer system.

"The module for emulation of file execution" refers to actual devices, systems, components, groups of components implemented using hardware (such as integrated microcircuits (application-specific integrated circuit, ASIC) or programmable gate arrays (field-programmable gate array, FPGA)) or, for example, a combination of software and hardware (such as a microprocessor system and a set of software instructions, as well as neuromorphic chips (neurosynaptic chips)). The functionality of the emulation module can be implemented exclusively by hardware, and also a combination, where some of the functionality of the emulation module is implemented by software, and some by hardware. In some embodiments, the emulation module may be implemented on the processor of a general-purpose computer (for example, such as is shown in FIG. 6). The system components may be implemented on a single computing device or distributed among several interconnected computing devices.

An "executable file" refers to a file containing an application in a form in which it can be executed on a computer. Hence, the terms "application" and "executable file" can be used interchangeably in the present disclosure.

"Virtual code of an API function" refers to a code consisting of instructions for the processor of the computer generating the result of the execution of that API function.

"Native code of an API function" refers to the previously compiled machine code of the API function (for the virtual processor of an emulator), consisting of instructions and completely simulating the execution of the corresponding API function. In other words, native code contains at least some of the instructions of the actual API function adapted for execution on the virtual processor of an emulator.

Figure 1:
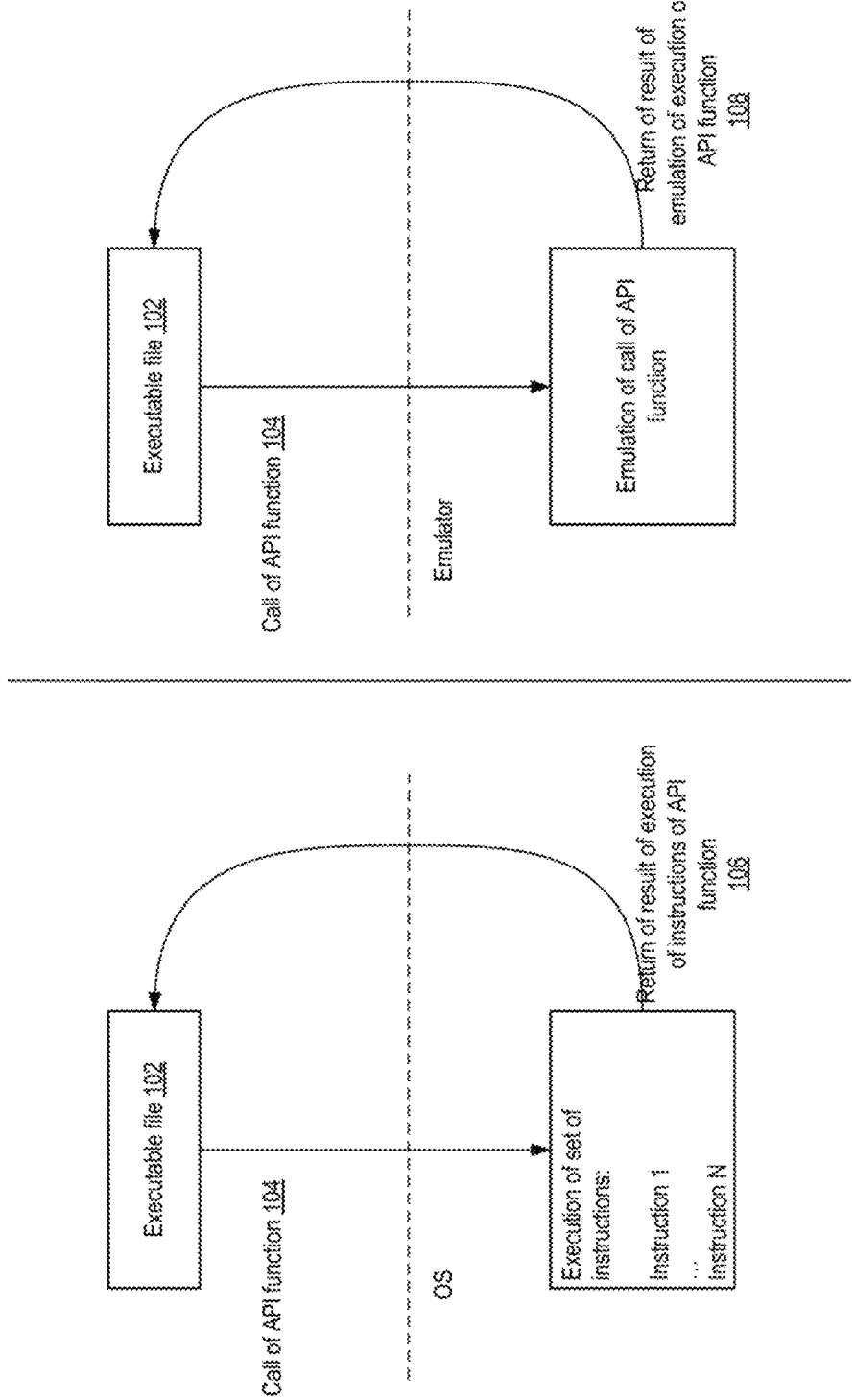
FIG. 1 shows a block diagram of a conventional emulator handling an API function call.

FIG. 1 shows a block diagram of a conventional emulator handling an API function call. It should be noted that API functions may not be limited to Windows API. As used herein, "API functions" may refer to functions of any usable API, such as Linux Kernel API, OpenGL, Qt and the like. When the call for an API function 104 is invoked during the execution of an application (executable file) 102 in an actual OS, the OS may perform a large number of actions involving the complex internal architecture of the OS. Schematically, an API function call 104 results in the execution of a large number of instructions on the processor, after which the result of the execution of the API function 106 is returned to the application 102. During the execution of an emulator, an API function call does not necessarily result in the same execution of a same series of instructions as in an actual OS, but rather returns an emulated (simulated) result 108 of the execution of the API function to the application 102. For example, in an attempt to create a file, the emulator 400 may return the pointer to a virtual file. Even though both execution of the file by an actual OS and by the emulator 400 return a file pointer, the results (106 and 108) of the execution of an invoked API function may be different, due to the fact that certain registers of the processor may be changed, for example, when the API function is called, which may not be fully reflected in the execution of the emulator. It should be noted that this discrepancy may be utilized to counteract the emulation and especially by malicious programs.

Figure 2:
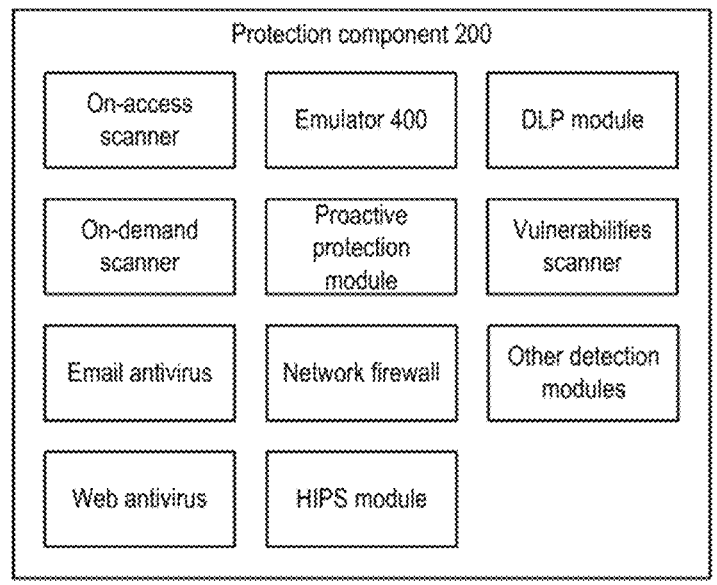
FIG. 2 shows a block diagram of an exemplary protection component for a computer, in accordance with aspects of the present disclosure.

FIG. 2 shows a block diagram of an exemplary protection component for a computer, in accordance with aspects of the present disclosure. The protection (antivirus) component 200 for the computing device 300 may contain modules designed to ensure the security of the computer 300, including, but not limited to: an on-access scanner, an on-demand scanner, an email antivirus, a web antivirus, a proactive protection module, a HIPS (Host Intrusion Prevention System) module, a DLP (Data Loss Prevention) module, a vulnerabilities scanner, an emulator 400, a network firewall, and the like. In an embodiment, the indicated modules may be components of the protection component 200. In yet another embodiment, these modules may be implemented as separate software components.

An on-access scanner may be configured to detect malicious activity of all files being opened, launched, and saved on the user's computer system. An on-demand scanner may differ from the on-access scanner in that it may scan files and directories specified by the user on demand of the user.

The email antivirus may be configured to check incoming and outgoing emails for malicious objects. The web antivirus may serve to prevent the execution of malicious code which might be contained on web sites visited by the user, and also to block the opening of particular web sites. The HIPS module may be configured to detect unwanted and malicious activity of programs and to block such activity at the moment of execution. The DLP module may be configured to detect and prevent loss of confidential data from the computer or network. The vulnerabilities scanner may be configured to detect vulnerabilities on the computer. For example, the vulnerabilities scanner may detect that certain components of the protection module 200 have been disconnected, that virus databases are not up to date, that a network port has been closed, and the like. The network firewall may be configured to monitor and filter network traffic in accordance with specified rules. The emulator 400 may be configured to simulate a guest system during the execution of file instructions in the emulator 400 and will be discussed in greater detail below. The proactive protection component 200 may use behavioral signatures to detect the behavior of files being executed and to classify them by level of trust.

Figure 3:
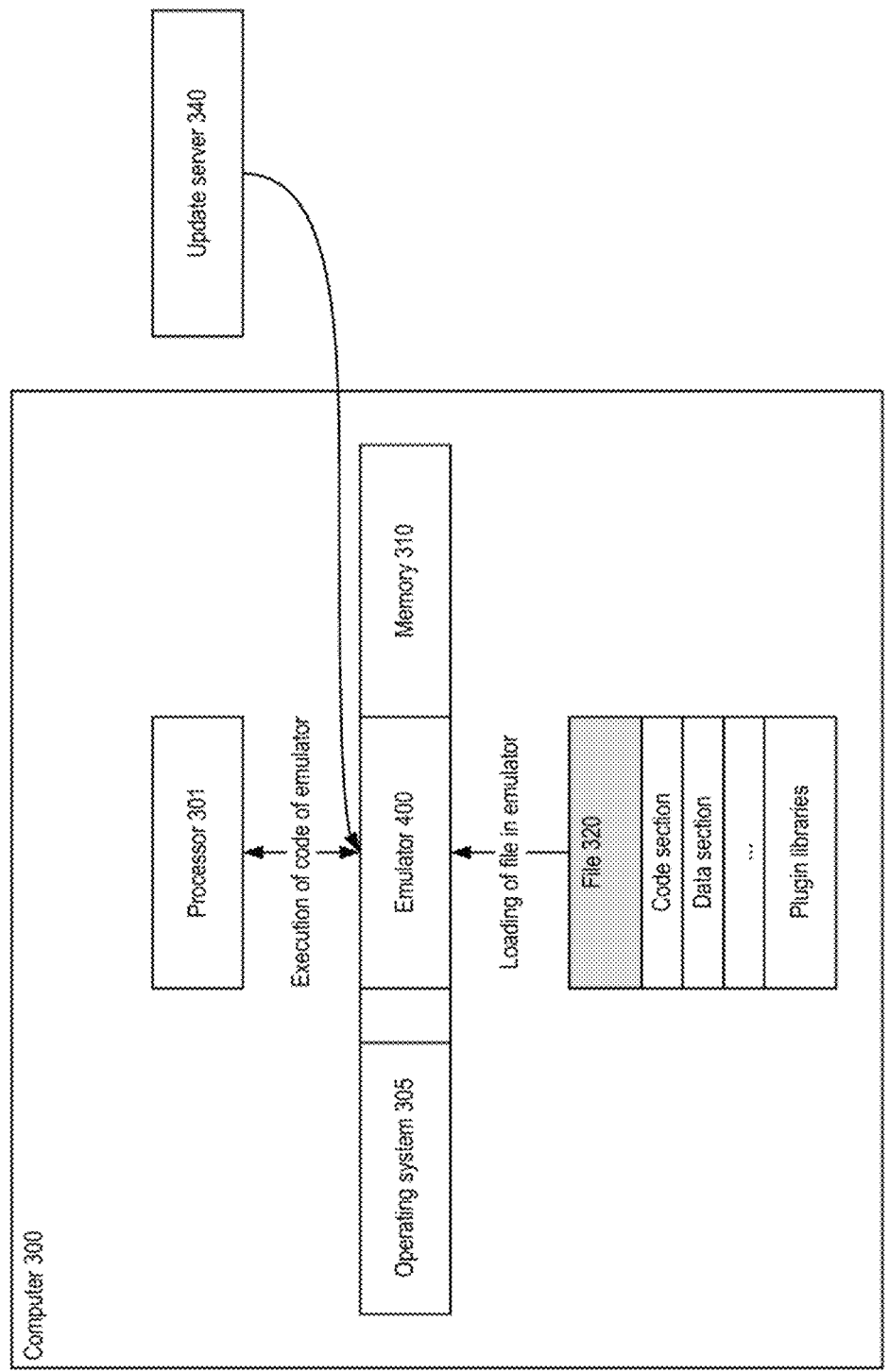
FIG. 3 illustrates an example of the execution of file instructions in an emulator.

FIG. 3 illustrates the execution of file instructions in an emulator, in accordance with aspects of the present disclosure. The emulator 400 may be installed on a computing device of a user (hereafter, a computer) 300. The emulator 400 may be a component of the protection component 200, which is illustrated in FIG. 2, or it may be an independent application, or a hardware component of the computer 300, or part of the OS 305. In an embodiment, the emulator 400 may be used to detect malicious code in a file 320, but it may also be used for other purposes. For example, the emulator 400 may be used for debugging of applications, such as a file 320, if this is an executable file. The role of the executing device in the emulator 400 may be played by the emulation module 403, which may directly emulate the execution of the instructions. The emulator 400 and the various components of the emulator 400 will be described hereafter. An application which may have various functionality, including, for example, being a software installer, is shown in FIG. 3 in the form of the file 320. In other embodiments, the file 320 may be nonexecutable, and a compiler or interpreter may be additionally needed for its reproduction. The file 320 may be stored on a disk 27 or on another external memory and may contain instructions which can be executed on a processor. Thus, in different embodiments the file 320 may be one of:
- an executable file, such as a file in PE (Portable Executable) format;
- a file of a library, such as the dynamic link library or DLL for the OS Windows;
- a driver;
- a script file, such as a JavaScript file, which can be executed by a JavaScript interpreter, or a batch file, which can be executed by a console command interpreter, such as cmd.exe for the OS Windows.

Further, to simplify the description, an executable file will be considered in the following text. An example of an executable file is a file in the Portable Executable (PE) format in the OS Windows. The PE file may contain the following principal fields: a header, a code section, a data section and an import table, which may contain links to plugin libraries.

Nevertheless, as mentioned above, the file 320 may be any given file containing instructions which can be executed on a processor.

In one embodiment, when the file 320 is an executable file, the emulation of the execution of the instructions of the file 320 by the emulation module 403 may occur in the context of the process of that executable file. That is, the emulation of the execution of the instructions of the file 320 starts at the entry point of that process.

In another embodiment, when the file 320 is a library file (such as a DLL), the emulation of the execution of the instructions of the library file occurs in the context of a specified process. That process may be a process specified by the emulator 400 and may be specially created as a host process for the emulation of the instructions of the library files. Such a process may contain the calls of the library functions which need to be emulated.

In yet another particular exemplary embodiment, when the file 320 is a driver, the emulation module 403 may call up the instructions of the driver by using a system process (in the OS Windows, the system process). In other words, the emulation module 402 may emulate the execution of the driver file in the context of a system process.

In an embodiment, when the file 320 is a script file (or a library of a script language), the emulation module 403 may emulate the instructions of the script file in the context of an interpreter process for the file 320. The file 320 may be additionally sent to the input of the interpreter. For certain popular script languages, the emulator 400 may additionally include an interpreter embodiment. However, the file 320 is usually distributed along with an interpreter file, and in this case the emulation module 403 may begin emulating the execution of the interpreter process. The execution of the interpreter process will result in the file 320, being a script file, loaded at input of the emulation module 403. In one example, when the file is a file in "bat" format, containing console commands, the emulation module 403 may emulate the execution of the file 320 in the context of a process of the console command interpreter cmd.exe.

In the presented embodiment, the computer system is supplemented with an emulator 400, which is embodied in the form of a program that can be executed at the application level. In other embodiments, the emulator 400 may be part of the operating system 305 or a separate device. The emulator 400, having been loaded into the memory 310 of the computer device 300 and being executable on the processor 301, may carry out a parsing of the file 320 and a processing of its code. Advantageously, the application being analyzed may be loaded into the address space of the emulator 400. The software implementation of the emulator 400 makes it possible to process the code and the resources of the application in a way similar to the processor 301 and the operating system 305. The emulator 400 may be connected to an update server 340, which may be configured for updating the code of the emulator 400, and for updating the separate modules of the emulator 400.

Figure 4:
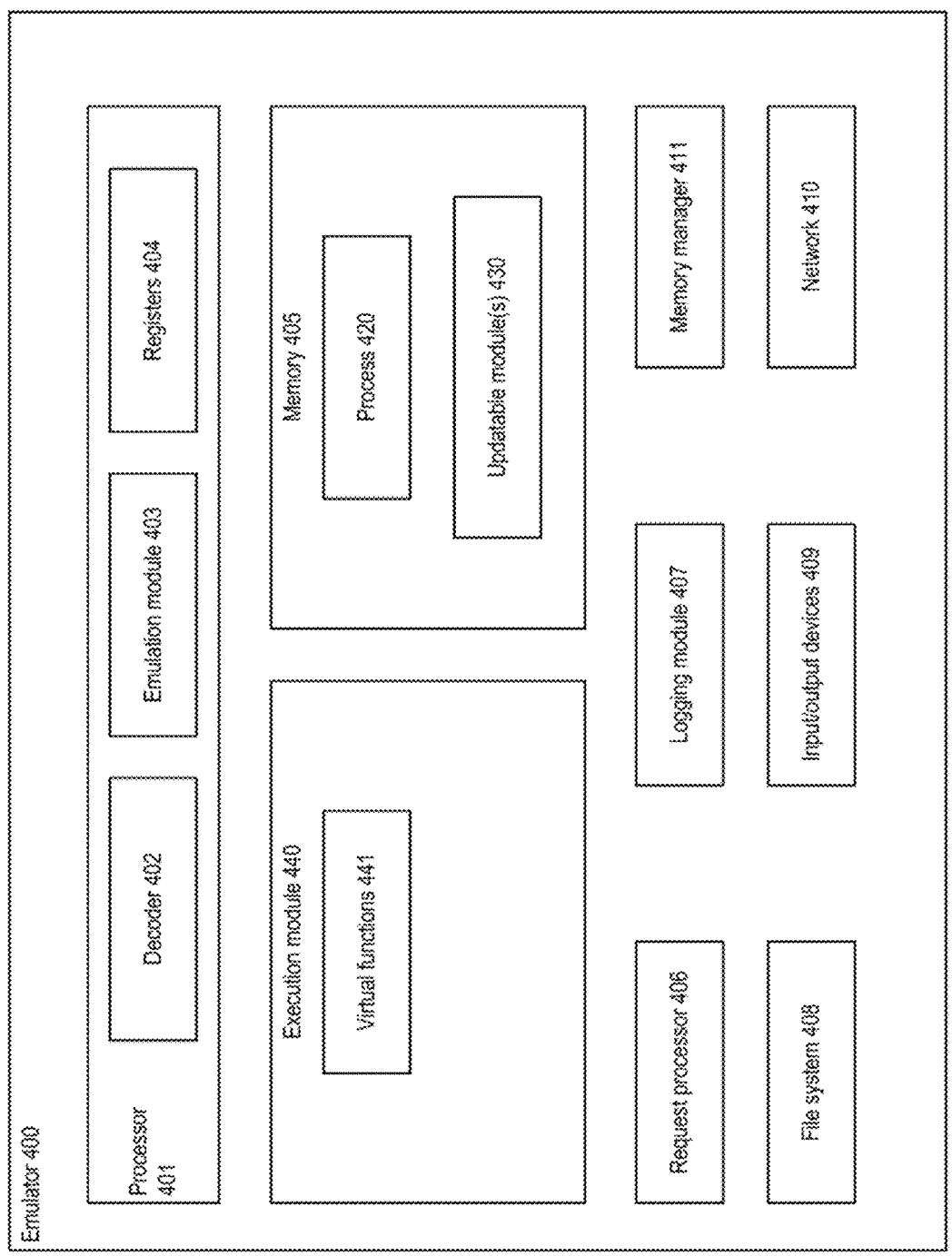
FIG. 4 shows a block diagram of an exemplary emulator.

FIG. 4 shows a block diagram of an emulator, in accordance with aspects of the present disclosure In one embodiment for the implementation of an emulator 400 which is able to execute the instructions of the file 320, it may be necessary to recreate the processor 401 (also referred to herein as virtual processor), the registers of the processor 404, the memory 405 and the memory manager 411. A decoder 402 may be used to transform the code instructions of the file 320 into the internal system of commands of the executing devices. The registers of the processor 404 may reside directly in the kernel of the processor 401. In addition, the emulator 400 may include a file system 408, input/output devices 409 and a data transmission network 410. In certain embodiments, it may be possible to reproduce the functions of the operating system 305 and the external services. The process 420 in whose context the file 320 will be executed may be reproduced in the address space of the emulator 400. The process 420 may be placed in the recreated memory 405. The memory manager 411 may be configured to perform various memory operations, such as, without limitations: allocation, deallocation, reservation, mapping, unmapping, and the like. For example, the memory manager 411 may create and destroy the recreated memory 405.

For an executable file, the process 420 is an executable file process. Files 320 of other types will be executed in the context of a process 420 whose particular variant embodiments have been indicated above. A separate functional unit, namely a request processor 406, may be set aside to monitor the program instructions being processed in the emulator 400 and the program instructions possibly needing to be sent to the actual environment for execution. The progress of the execution of the program in the emulator 400 in the form of a sequence of executable commands may be managed by a logging module 407. The logging module 407 may reside in the emulator 400 and be duplicated on the computer 300 or it may reside on the computer 300. In this case, the protection component 200 may have access to the logging module 407 or its copy and may quickly detect the signatures of malicious code. It should be noted that the modules 401-411 illustrated in FIG. 4 may be virtual copies simulating the execution of the actual modules present on the computer 300, such as the processor 301, the memory 310, and other hardware and software of the computer 300.

The emulator 400 may include an emulation module 403 operatively connected to an execution module 440 and virtual functions 441. The principal elements of the actual processor 301 may be execution devices configured to carry out all of the instructions. Such execution devices may be divided in two main groups: the arithmetic and logic units (ALU) and the floating point units (FPU). Therefore, in the emulator 400, the role of the execution device is played by the emulation module 403.

Furthermore, the emulator 400 may include a set of updatable modules 430. The set of modules may include at least one updatable module. Each updatable module may contain an embodiment of one or more native functions. In an embodiment, the updatable module 430 may contain a native embodiment of several API functions pertaining to the same library present on the computer 300. In an embodiment, a generated code may be used by the emulator 400 for other functions of the library for which no native code has been written and thus not present in the updatable module 430. This generated code may return a generated result, which can be arbitrary, or depend on the type of the function, or may simply return a default value. The generated code may be used for functions not performing a useful functionality or seldom used functions, such as, but not limited to, FlushFileBuffers, FreeConsole, LockFile, SetConsoleCursor. The generated code may be implemented in the form of a virtual code and may be executed by the execution module 440. In other words, the generated code may also be a virtual code. In yet another embodiment, there may be no embodiment at all for the other functions of the library, in which case control will be transferred directly to the execution module 440. As noted above, the updatable module 430 may contain a native embodiment of several API functions pertaining to the same library present on the computer 300. However, at least in some cases, it may not be feasible to include in the updatable module 430 the implementation of all API functions from the library present on the computer 300. In this case, when the implementation (embodiment) of some API function of library is absent in the updatable module 430, the control may be transferred to the execution module 440 in such a manner that the execution module 440 may continue the execution using its own rules.

In the present disclosure, "native code" refers to a previously compiled machine code of an API function, consisting of instructions designed to be executed by the emulator 400. These instructions are configured to simulate the execution of a corresponding API function. Thus, a native code contains all or most of the instructions of the actual API function, being adapted for execution on the virtual processor 401 of the emulator 400. It should also be noted that the same native code may also be executed on the actual processor of a computer. The execution of the native code of API functions may be emulated by the emulation module 403 on the virtual processor 401 of the emulator 400 the same way as the execution of the process 420 in whose context the instructions of the file 320 are being carried out. The emulation of the execution of the virtual code of API functions 441 may have already been done by the execution module 440 on the actual processor 301 of the computer 300. In other words, the virtual code does not perform a detailed simulation of the API function 441, but may merely generate the result of the execution of the API function 441. This generated result may be indicative of the result of the execution of the API function. The generated result may include the returnable value and the change in state of the registers and/or the stack of the processor, depending on the implementation of the virtual code of that API function. For example, in response to the calling of a function for working with a file, the emulation module 403 may return the file handler of the requested file. It should be further noted that the emulation of further instructions may be carried out with respect to the changes in the state of registers and/or the stack of the processor.

In an embodiment of the present invention, at least one updatable module 430 may include two implementations of API functions written for processors with 32-bit and with 64-bit architectures. In another embodiment, for at least one updatable module 430 containing an implementation of 32-bit API functions, an additional updatable module 430 may also be written containing an implementation of those same API functions for a 64-bit architecture. A single code of the emulator 400 (the modules 401-411, the execution module 440) may be used for the emulation of the 32-bit and 64-bit API functions. This makes it possible to emulate the execution of the processes of files written for both 32-bit and 64-bit processor architecture. As a result, advantageously, the volume of disk space occupied by the main code of the emulator 400 may be reduced significantly, and the speed and performance of the emulation may be increased. It should also be noted that modules containing the 32-bit implementation of the API functions and modules containing the 64-bit implementation of the API functions can be updated by the update server 340 independently of each other.

The execution module 440 may include virtual functions 441 and their implementation. The emulator 400 may be linked to an update server 340, which may be configured for updating the modules 430, the virtual functions 441, the emulation module 403 and the execution module 440. The updating of these modules can be done independently.

It should be noted that the indicated modules of the emulator 400 and the updatable modules of the emulator 430 may be implemented by different methods. In an embodiment, each updatable module 430 may be stored on the computer 300 separately from each other (for example, in different files). The emulation module 403, the execution module 440 and the virtual functions 441 may also be kept separately from each other. In another example, the same file may include several modules. For example, the execution module 440 may contain the virtual functions 441.

In an embodiment, the API functions may be implemented in a single copy—either in one of the updatable modules 430, or in the form of a virtual function 441. In an embodiment, a duplication of the implementation of an API function in several places may be possible. For example, if a certain function was initially implemented in the form of a virtual function 441, a native implementation of that function may then be developed in an updatable module 430, which may be updated and sent to the computer 300 by the update server 340. Because the updating of the modules 403, 440 may occur less often than the updating of the modules 430, there may be two implementations of that function in the emulator 400. One of the implementations may be in the updatable module 430, while another implementation may be in the form of the virtual function 441. The selection of the particular implementation of the function that will be used in the emulation process may be done either at the stage of initialization of the emulator 400 or during the emulation process. The initialization of the emulator 400 is discussed below.

The process of loading the operating system is explained briefly on the example of the OS Windows. At first, the Windows Boot Manager is loaded, being responsible for finding the installed OS Windows and selecting it for loading. Next, the basic drivers are loaded, making it possible, for example, to work with the hard disk partition where the selected OS is installed. Next, a portion of the OS kernel is read from the disk and loaded into memory, such as Ntosrnl.exe and hal.dll. Next, initialization is done for the registry, the memory manager, the objects manager, and the like. The session manager (smss.exe) is then loaded, being responsible for loading the system variables, the Win32 subsystem, and the further loading of winlogon.exe. After the user has successfully undergone authentication, the applications and services registered with a startup key will be loaded. After the applications and services registered with a startup key are all loaded, the OS will be fully ready to interact with the user, awaiting the launching of applications and the entry of data.

For the initialization and execution of the emulator 400, it may not be necessary to fully emulate the loading of the operating system 305. For example, only the stages of loading the kernel of the OS 305 and the session manager in simplified form into the memory 405 of the emulator 400 can remain. In other words, it may be sufficient to emulate the functionality which is most essential to the execution of the OS 305, enabling an emulation of the application. For Win32 applications, it may be necessary to emulate the launching of smss.exe followed by the launching of csrss.exe, which initializes the Windows subsystem and makes it possible to create processes and threads. Since the emulation of a potentially malicious application requires the creation of a more detailed runtime environment (for example, the emulation of other processes launched), it may also be necessary to emulate the launching of winlogon.exe followed by a "launching" of such processes as explorer.exe and services.exe. Furthermore, it may be possible to emulate the "launching" of svchost.exe processes from the latter. The term "launching", as used herein, refers to a recreation in the emulator 400 of the same processes which occur during the creation of the processes within an actual OS, but in somewhat simplified form. Such an approach makes it possible to recreate an actual OS to a degree sufficient for enabling the launching of almost any application designed to work in that OS.

Moreover, the initialization of the emulator 400 may include the loading into memory 405 of the modules 401-411, 440, 441 and some or all of the updatable modules 430. The process 420 within which the file 320 may be executed can be loaded into memory 405 prior to the start of emulation of the file 320.

In one embodiment, the emulator 400 may be initialized prior to the emulation of the execution of the process 420. In yet another embodiment, during the initialization of the emulator 400 there may be loaded into memory 405 the updatable modules 430 according to the import table of the file 320. In other words, the updatable modules 430 may contain the implementation of the functions from the import table of the file 320. Thus, the emulator 400, and specifically the emulation module 403 and the execution module 440, may "know" which API functions they will emulate or execute after the initialization of the emulator 400. Accordingly, in the previously described method, the emulation module 403 may transfer control to the execution module 440 if the API function is not found in the set of updatable modules 430. This operation is typically not taking up too much time. In another embodiment, if a complete antivirus scan is performed (either on demand or by schedule), all of the updatable modules 430 from the set of modules may be loaded into the memory 405 of the emulator 400. As used herein, "a complete antivirus scan" refers to checking of all the files of a particular disk, disk partition, or directory. In yet another embodiment, when an antivirus scan is performed upon access, a specified number of the most often used updatable modules from the set of modules 430 may be loaded into memory 405. In yet another embodiment, the emulator 400 may be initialized by loading an image of the emulator (or a snapshot of the emulator) prior to the emulation of the execution of the process 420. Examples of the use of emulator images are disclosed in U.S. Pat. No. 9,111,096.

It should be noted that, in one embodiment, when the updatable module 430 contains an implementation of an API function which duplicates the implementation of a virtual API function 441, the updatable module 430 may also contain priority information indicating which implementation of the API function is considered to have higher priority. Such priority information may be contained in the form of a table with the names of the API functions and their priorities or date of implementation. Accordingly, during the initialization of the emulator 400, the priority variant implementations of the API functions may be loaded into memory 405. Thus, for each API function, there may be a single implementation in memory, ensuring optimal effectiveness of the emulator 400.

Figure 5:
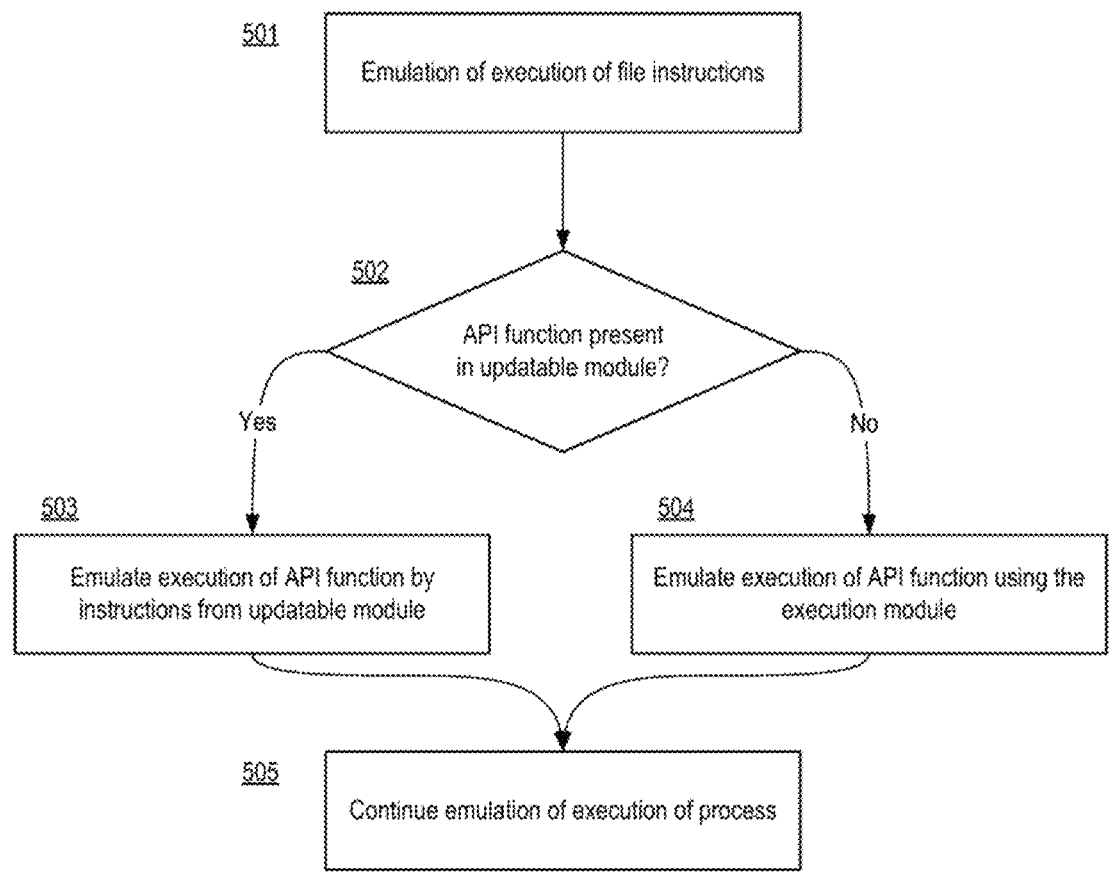
FIG. 5 illustrates an exemplary method for emulating execution of a file.

FIG. 5 illustrates a method for emulating execution of a file, in accordance with aspects of the present disclosure. The emulation method may be carried out by an initialized emulator 400. The process of initialization of the emulator 400 and particular embodiments of the initialization of the emulator 400 have been described above. According to an embodiment, after the initialization of the emulator 400 and prior to the start of the emulation, the emulator 400 may create the process. The memory manager 411 may create the address space of the process 420 in which the instructions of the file 320 will be executed, and may attach the created address space to the created process 420.

At step 501, the emulation module 403 may be used to carry out an emulation of the execution of the instructions of the file 320 on the virtual processor 401 of the emulator 400. The emulation module 403 may halt the emulation of the execution of the process 420 in response to an invocation of an API function. At step 502, the emulation module 403 may determine whether the invoked API function is present in one of the updatable modules 430 shown in FIG. 4. If the emulation module 403 finds the invoked API function in one of the updatable modules 430, then, at step 503, the emulation module 403 may emulate the execution of the API function by executing API function instructions, according to the implementation of that API function from the corresponding updatable module 430. However, if the emulation module 403 does not find the invoked API function in one of the updatable modules 430, then, at step 504, the execution module 440 may generate the result of the execution of the corresponding API function according to the virtual implementation of the API function which may be generated using the execution module 440. The emulation by the execution module 440 may be done not on the virtual processor 401 of the emulator 400, but on the actual processor 301 of the computer 300 in the context of the process of the emulator 400. As a result, at step 505, the emulation module 403 may continue the emulation of the execution of the process 420 from the instruction located at the return address of the API function. In other words, at step 505, the emulation module 403 may utilize the result of the emulation of the execution of the API function.

It should also be noted that during the emulation steps described above a logging module 407 may record data on the invocations of the API functions and data on the returns from the API functions in a log process. Furthermore, during the emulation process or right after the completion of the emulation, the protection component 200 may use the results provided by the emulator 400 to perform a search for virus signatures using, for example, heuristic rules. If the protection component 200 finds a virus signature, the protection component may declare the file 320 as being malicious file. At least in some embodiments, subsequent mitigation steps may be taken by the protection component 200 to eliminate the discovered threat. Such mitigation steps may include, but are not limited to: prevention of the execution of the file 320 on the actual computer 300, an attempt to cure or remove the file 320, among other mitigation actions.

According to an embodiment of the present invention, the emulation module 403 may continue the emulation until the occurrence of a halting condition for halting the emulation. In an embodiment, the halting condition may include, but is not limited to one of the following:
 a predefined number of instructions and/or API functions has been emulated;
 the time allocated for the emulation has elapsed;
 a virus signature has been triggered.

In one exemplary embodiment, if the updatable module 430 containing the API function is not present in memory 405, the emulation module 403 may load that updatable module 430 into memory 405. Next, the emulation of the corresponding API function by the emulation module 403 may continue. In yet another embodiment, the emulation module 403 may not load all processes included in the list of processes maintained by the emulator 400 into memory 405. The list of processes maintained by the emulator 400 may reflect the names and the unique identifiers of such processes. If one of the processes included in the list is invoked by an instruction of the file 320 being investigated, the emulation module 403 may load the corresponding process into memory 405 on demand in order to continue the proper emulation.

In yet another particular embodiment, at step 504 described above, the execution module 440 may generate the code configured to return the result of the execution of the invoked API function. The code generated by the execution module 440 may be a stub. Furthermore, the generated code may return a generated result. In various embodiments, the generated result may have arbitrary values or it may depend on the parameters of the API function call and may depend on the convention for invoking the corresponding API function. For example, in response to an invocation of an API function working with a file, the code generated by the execution module 440 may return an arbitrary file handler, as a result of the API function invocation. As another non-limiting example, if the invoked API function deals with integer numbers, the code generated by the execution module 440 may return an arbitrary integer, such as 0. The emulation module 403 may halt the emulation if the API function call parameters or the API function call convention are not known to the emulation module 403. It should be further noted that the code generated by the execution module 440 may be either a virtual code or a native code.

In summary, the disclosed embodiments enhance the quality of the emulation of execution of instructions of a file by utilizing implementation of API functions contained in updatable modules 430 of the emulator 400. Furthermore, utilization of implementations of API functions contained in the updatable module 430 may improve the reliability of the emulation of the file instructions. The reliability of the emulation is greater the more functions of the actual system the emulator 400 is capable to simulate. Moreover, the more accurately the functions of the actual system are simulated by the emulator 400, the greater the reliability of the emulation. Advantageously, an increased detection rate for malicious code may be achieved by using the emulator 400 configured to use the aforementioned techniques. As yet another benefit, the response time to new threats may be reduced by using the updatable modules 430 containing an implementation of the API functions.

FIG. 6 is a block diagram illustrating a computer system 300 on which aspects of systems and methods for emulating execution of a file may be implemented in accordance with an exemplary aspect. The computer system 300 may represent the computer system of FIG. 3 hosting the emulator 400 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 300 includes a central processing unit (CPU) 301, a system memory 310, and a system bus 23 connecting the various system components, including the memory associated with the central processing unit 301. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 301 (also referred to as a processor) can include a single or multiple sets of processors having single or multiple cores. The processor 301 may execute one or more computer-executable code implementing the techniques of the present disclosure. The system memory 310 may be any memory for storing data used herein and/or computer programs that are executable by the processor 301. The system memory 310 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 300, such as those at the time of loading the operating system with the use of the ROM 24.

The computer system 300 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 300. The system memory 310, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 300.

The system memory 310, removable storage devices 27, and non-removable storage devices 28 of the computer system 300 may be used to store an operating system 305, additional program applications 37, other program modules 38, and program data 39. The computer system 300 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 300 may be equipped with other peripheral output devices (not shown), such as loudspeakers and other audiovisual devices.

The computer system 300 may operate in a network environment, using a network connection to one or more remote computers 49. The remote computer (or computers) 49 may be local computer workstations or servers comprising most or all of the aforementioned elements in describing the nature of a computer system 300. Other devices may also be present in the computer network, such as, but not limited to, routers, network stations, peer devices or other network nodes. The computer system 300 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 300. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine under-taking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for emulating execution of a file, the method comprising:
   emulating execution of one or more instructions of a file on a virtual processor of an emulator;
   halting the execution of the one or more instructions in response to an invocation of an Application Programming Interface (API) function;
   determining whether the invoked API function is present in one or more updatable modules of the emulator, wherein the one or more updatable modules contain implementation of one or more API functions;
   in response to determining that the invoked API function is present in the one or more updatable modules, emulating execution of the invoked API function according to corresponding implementation contained in the one or more updatable modules;
   in response to determining that the invoked API function is not present in the one or more updatable modules, generating result of execution of the invoked API function by executing a corresponding virtual API function on a processor of a computing device, wherein the result of the execution of the invoked API function includes at least: a change in state of one or more registers and a change in a stack of a corresponding process or a change in a stack of the emulator; and
   continuing the execution of the one or more instructions using the result of the execution of the invoked API function, wherein the continuing execution of the one or more instructions is carried out with respect to the changes.

2. The method of claim 1, wherein the file comprises one of an executable file, a library file, a driver, a script file, or a batch file containing console commands.

3. The method of claim 2, wherein emulating execution of the one or more instructions of the executable file includes emulating the one or more instructions in a context of a process of the executable file.

4. The method of claim 2, wherein emulating execution of the one or more instructions of the library file includes emulating the one or more instructions in a context of a specified process containing a plurality of calls of library functions to be emulated.

5. The method of claim 2, wherein emulating execution of the one or more instructions of the driver includes emulating the one or more instructions in a context of a system process.

6. The method of claim 2, wherein emulating execution of the one or more instructions of the script file includes emulating the one or more instructions in a context of an interpreter process for the file, wherein the file is additionally sent to an input of the interpreter.

7. The method of claim 2, wherein emulating execution of the one or more instructions of the batch file containing console commands includes emulating the one or more instructions in a context of a process of a console command interpreter.

8. The method of claim 1, wherein the invoked API function in the one or more updatable modules is implemented using a precompiled native code of the API function, wherein the native code includes one or more instructions simulating the execution of the invoked API function.

9. The method of claim 1, wherein at least one API function present in the one or more updatable modules is implemented using virtual code, wherein the virtual code comprises a code sequence consisting of instructions for the processor to generate the result of the execution of the at least one API function.

10. The method of claim 1, wherein the generated result depends on one or more parameters of the invoked API function call and/or depends on a convention for invoking the corresponding API function.

11. The method of claim 2, wherein the execution of the one or more instructions continues until one or more conditions for halting the emulation occurs and wherein the one or more halting conditions comprise: a predefined number of instructions has been emulated, a predefined number of API functions has been emulated, time allocated for the emulation has elapsed, a virus signature has been triggered.

12. A system emulating execution of a file, the system comprising:
   a hardware processor configured to:
   emulate execution of one or more instructions of a file by executing the loaded process on a virtual processor of an emulator;
   halt the execution of the one or more instructions in response to an invocation of an Application Programming Interface (API) function;
   determine whether the invoked API function is present in one or more updatable modules of the emulator, wherein the one or more updatable modules contain implementation of one or more API functions;
   in response to determining that the invoked API function is present in the one or more updatable modules, emulate execution of the invoked API function according to corresponding implementation contained in the one or more updatable modules;
   in response to determining that the invoked API function is not present in the one or more updatable modules, generate result of execution of the invoked API function by executing a corresponding virtual API function on a processor of a computing device, wherein the result of the execution of the invoked API function includes at least: a change in state of one or more registers and a change in a stack of a corresponding process or a change in a stack of the emulator; and
   continue the execution of the one or more instructions using the result of the execution of the invoked API function, wherein the continuing execution of the one or more instructions is carried out with respect to the changes.

13. The system of claim 12, wherein the file comprises one of: an executable file, a library file, a driver, a script file, or a batch file containing console commands.

14. The system of claim 13, wherein the hardware processor configured to emulate execution of the one or more instructions of the executable file is further configured to emulate the one or more instructions in a context of a process of the executable file.

15. The system of claim 13, wherein the hardware processor configured to emulate execution of the one or more instructions of the library file is further configured to emulate the one or more instructions in a context of a specified process containing a plurality of calls of library functions to be emulated.

16. The system of claim 12, wherein the invoked API function in the one or more updatable modules is implemented using a precompiled native code of the API function, wherein the native code includes one or more instructions simulating the execution of the invoked API function.

17. The system of claim 12, wherein at least one API function present in the one or more updatable modules is implemented using virtual code, wherein the virtual code comprises a code sequence consisting of instructions for the processor to generate the result of the execution of the at least one API function.

18. A non-transitory computer readable medium storing thereon computer executable instructions for emulating execution of a file, including instructions for:

emulating execution of one or more instructions of a file on a virtual processor of an emulator;

halting the execution of the one or more instructions in response to an invocation of an Application Programming Interface (API) function;

determining whether the invoked API function is present in one or more updatable modules of the emulator, wherein the one or more updatable modules contain implementation of one or more API functions;

in response to determining that the invoked API function is present in the one or more updatable modules, emulating execution of the invoked API function according to corresponding implementation contained in the one or more updatable modules;

in response to determining that the invoked API function is not present in the one or more updatable modules, generating result of execution of the invoked API function by executing a corresponding virtual API function on a processor of a computing device, wherein the result of the execution of the invoked API function includes at least: a change in state of one or more registers and a change in a stack of a corresponding process or a change in a stack of the emulator; and continuing the execution of the one or more instructions using the result of the execution of the invoked API function, wherein the continuing execution of the one or more instructions is carried out with respect to the changes.

* * * * *